US009077622B2

(12) United States Patent
Tse et al.

(10) Patent No.: US 9,077,622 B2
(45) Date of Patent: Jul. 7, 2015

(54) METHOD AND APPARATUS FOR AUTOMATIC VPN LOGIN ON INTERFACE SELECTION

(71) Applicant: Research In Motion Limited, Waterloo (CA)

(72) Inventors: Chi Chiu Tse, Markham (CA); Elliott Michael Guy Mazzuca, Etobicoke (CA); Alan Pak-Lun Ho, Unionville (CA)

(73) Assignee: BlackBerry Limited, Waterloo (CA)

( * ) Notice: Subject to any disclaimer, the term of this patent is extended or adjusted under 35 U.S.C. 154(b) by 134 days.

(21) Appl. No.: 13/717,280

(22) Filed: Dec. 17, 2012

(65) Prior Publication Data

US 2013/0215740 A1    Aug. 22, 2013

Related U.S. Application Data

(60) Provisional application No. 61/599,476, filed on Feb. 16, 2012, provisional application No. 61/599,480, filed on Feb. 16, 2012.

(51) Int. Cl.
*H04L 12/24* (2006.01)
*H04W 48/18* (2009.01)
(Continued)

(52) U.S. Cl.
CPC ......... *H04L 41/0816* (2013.01); *H04L 63/0272* (2013.01); *H04W 12/08* (2013.01); *H04W 48/18* (2013.01); *H04W 88/06* (2013.01); *H04L 41/0806* (2013.01)

(58) Field of Classification Search
CPC .. H04L 12/24; H04L 41/0816; H04L 41/0806

USPC .......... 370/228, 255; 455/552.1, 557, 434, 62
See application file for complete search history.

(56) References Cited

U.S. PATENT DOCUMENTS 4,945,556 A    7/1990   Namekawa
5,864,765 A    1/1999   Barvesten
(Continued)

FOREIGN PATENT DOCUMENTS

CA    2737994        11/2011
CN    101523878 A    9/2009
(Continued)

OTHER PUBLICATIONS

EP Application No. 12155659.1, Extended European Search Report dated Jan. 8, 2012.
(Continued)

*Primary Examiner* — Jamal Javaid
(74) *Attorney, Agent, or Firm* — Moffat & Co.

(57) ABSTRACT

A method and device for automatic login of a virtual private network on an interface change, the method: associating a virtual private network profile with a plurality of connection interfaces, each connection interface within the plurality of connection interfaces having a priority; monitoring the plurality of connection interfaces for availability; if a connection interface with a higher priority than the connection interface currently used by the virtual private network becomes available, utilizing the higher priority connection interface for the virtual private network; and if the connection interface currently used by the virtual private network becomes unavailable, transferring the virtual private network to a highest priority available connection interface within the plurality of connection interfaces.

21 Claims, 13 Drawing Sheets

(51) Int. Cl.
  *H04L 29/06* (2006.01)
  *H04W 12/08* (2009.01)
  *H04W 88/06* (2009.01)

(56) References Cited

U.S. PATENT DOCUMENTS

| | | | |
|---|---|---|---|
| 5,987,440 | A | 11/1999 | O'Neil et al. |
| 5,987,611 | A | 11/1999 | Freund |
| 6,052,735 | A | 4/2000 | Ulrich et al. |
| 6,105,132 | A | 8/2000 | Fritch et al. |
| 6,233,446 | B1 | 5/2001 | Do |
| 6,292,798 | B1 | 9/2001 | Dockter et al. |
| 6,351,816 | B1 | 2/2002 | Mueller et al. |
| 6,360,322 | B1 | 3/2002 | Grawrock |
| 6,405,202 | B1 | 6/2002 | Britton et al. |
| 6,412,070 | B1 | 6/2002 | Van Dyke et al. |
| 6,516,421 | B1 | 2/2003 | Peters |
| 6,647,388 | B2 | 11/2003 | Numao et al. |
| 6,668,323 | B1 | 12/2003 | Challener et al. |
| 6,757,821 | B1 | 6/2004 | Akiyama et al. |
| 6,772,350 | B1 | 8/2004 | Belani et al. |
| 6,795,688 | B1 | 9/2004 | Plasson et al. |
| 6,795,967 | B1 | 9/2004 | Evans et al. |
| 6,886,038 | B1 | 4/2005 | Tabbara et al. |
| 6,957,330 | B1 | 10/2005 | Hughes |
| 6,978,385 | B1 | 12/2005 | Cheston et al. |
| 6,999,562 | B2 | 2/2006 | Winick |
| 7,159,031 | B1 * | 1/2007 | Larkin et al. .................. 709/238 |
| 7,246,374 | B1 | 7/2007 | Simon et al. |
| 7,331,058 | B1 | 2/2008 | Gladney |
| 7,400,878 | B2 | 7/2008 | Hassan et al. |
| 7,574,200 | B2 | 8/2009 | Hassan et al. |
| 7,734,284 | B2 | 6/2010 | Adams et al. |
| 7,869,789 | B2 | 1/2011 | Hassan et al. |
| 8,074,078 | B2 | 12/2011 | Brown et al. |
| 8,126,960 | B2 | 2/2012 | Obradovich et al. |
| 2001/0047485 | A1 | 11/2001 | Brown et al. |
| 2002/0019944 | A1 | 2/2002 | Kou |
| 2002/0031230 | A1 | 3/2002 | Sweet et al. |
| 2002/0087880 | A1 | 7/2002 | Rhoades |
| 2002/0095414 | A1 | 7/2002 | Barnett et al. |
| 2002/0095497 | A1 | 7/2002 | Satagopan et al. |
| 2002/0112155 | A1 | 8/2002 | Martherus et al. |
| 2003/0005317 | A1 | 1/2003 | Audebert et al. |
| 2003/0026220 | A1 | 2/2003 | Uhlik et al. |
| 2003/0065676 | A1 | 4/2003 | Gbadegesin et al. |
| 2003/0093698 | A1 | 5/2003 | Challener et al. |
| 2003/0120948 | A1 | 6/2003 | Schmidt et al. |
| 2003/0126437 | A1 | 7/2003 | Wheeler et al. |
| 2003/0163685 | A1 | 8/2003 | Paatero |
| 2003/0177389 | A1 | 9/2003 | Albert et al. |
| 2003/0226015 | A1 | 12/2003 | Neufeld et al. |
| 2003/0236983 | A1 | 12/2003 | Mihm |
| 2004/0001101 | A1 | 1/2004 | Trajkovic et al. |
| 2004/0009751 | A1 * | 1/2004 | Michaelis et al. ............... 455/62 |
| 2004/0083382 | A1 | 4/2004 | Markham et al. |
| 2004/0100983 | A1 | 5/2004 | Suzuki |
| 2004/0209608 | A1 | 10/2004 | Kouznetsov et al. |
| 2005/0154935 | A1 | 7/2005 | Jin |
| 2005/0164687 | A1 | 7/2005 | DiFazio |
| 2005/0210270 | A1 | 9/2005 | Rohatgi et al. |
| 2005/0213763 | A1 | 9/2005 | Owen et al. |
| 2005/0245272 | A1 | 11/2005 | Spaur et al. |
| 2006/0059556 | A1 | 3/2006 | Royer |
| 2006/0070114 | A1 | 3/2006 | Wood et al. |
| 2006/0129848 | A1 | 6/2006 | Paksoy et al. |
| 2006/0129948 | A1 | 6/2006 | Hamzy et al. |
| 2006/0156026 | A1 | 7/2006 | Utin |
| 2006/0212589 | A1 | 9/2006 | Hayer et al. |
| 2007/0073694 | A1 | 3/2007 | Picault et al. |
| 2007/0180509 | A1 * | 8/2007 | Swartz et al. ...................... 726/9 |
| 2007/0277127 | A1 | 11/2007 | Carlson et al. |
| 2008/0081609 | A1 | 4/2008 | Burgan et al. |
| 2008/0181187 | A1 * | 7/2008 | Scott et al. ..................... 370/338 |
| 2008/0222711 | A1 | 9/2008 | Michaelis |
| 2010/0319053 | A1 | 12/2010 | Gharabally |
| 2011/0145833 | A1 | 6/2011 | De Los Reyes et al. |
| 2011/0314467 | A1 | 12/2011 | Pearson |
| 2012/0054853 | A1 | 3/2012 | Gupta et al. |
| 2012/0124640 | A1 | 5/2012 | Bender et al. |
| 2012/0144196 | A1 | 6/2012 | Owen et al. |

FOREIGN PATENT DOCUMENTS

| | | |
|---|---|---|
| EP | 0973350 | 1/2000 |
| GB | 2408179 A | 5/2005 |
| WO | 9905814 A2 | 2/1999 |
| WO | 0059225 | 10/2000 |
| WO | 2004008793 A1 | 1/2004 |
| WO | 2004031488 | 4/2004 |
| WO | 2005045550 A2 | 5/2005 |
| WO | 2008011420 A1 | 1/2008 |
| WO | 2009014975 A1 | 1/2009 |

OTHER PUBLICATIONS

U.S. Appl. No. 13/098,456, Office Action dated Sep. 13, 2012.
Olzak, Tom, IT Security (Dec. 15, 2008) "Use free sandboxing software to isolate risky behaviour". http://www.techrepublic.com/blog/security/use-free-sandboxing-software-to-isolate-risky-behavior/693.
Wikipedia "Operating system-level virtualization" http://en.wikipedia.org/wiki/Operating_system-level_virtualization (Dec. 5, 2008).
Wikipedia "Solaris Containers" http://en.wikipedia.org/wiki/Solaris_Containers (Mar. 16, 2010).
Morello, John (Oct. 2006). "Communication & Collaboration: Building an Emergency Operations Center on Groove and SharePoint". TechNet Magazine. Microsoft Corporation. http://technet.microsoft.com/en-us/magazine/2006.10.grooveandsharepoint.aspx.
Microsoft SharePoint Workspace http://en.wikipedia.org/wiki/Microsoft_SharePoint_Workspace (Jan. 6, 2012).
Chou, Yung (Oct. 2006). "Communication & Collaboration: Get into the Groove: Solutions for Secure and Dynamic Collaboration". TechNet Magazine. Microsoft Corporation. http://technet.microsoft.com/en-us/magazine/2006.10. intothegroove.aspx.
Lawson, Stephen, IDG News (Mar. 24, 2011) "PlayBook Will Need BlackBerry Tethering, to Start". PCWorld. http://www.pcworld.com/article/223274/playbook_will_need_blackberry_tethering_to_start.html.
Atkins, Lucas (Mar. 11, 2011) "First Look at BlackBerry Mobile HotSpot, Tethering for OS 6.1". http://n4bb.com/5027/first-look-at-blackberry-mobile-hotspot-tethering-os-6-1.
Hamblen, Matt, Computerworld (Jan. 13, 2011) "PlayBook to allow tethering to BlackBerry smartphones" http://www.computerworld.com/s/article/9204960/PlayBook_to_allow_tethering_to_BlackBerry_smartphones.
PCT application No. PCT/CA2011/001058, International Search Report and the Written Opinion of the International Searching Authority mailed Dec. 21, 2011.
Wikipedia, "Disk encryption" retrieved from http://en.wikipedia.org/wiki/Full_disk_encryption (Jan. 25, 2012).
Extended European Search Report mailed Jul. 13, 2012, in corresponding European patent application No. 12153439.0.
"Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf).
"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf).
EagleVision: A Pervasive Mobile Device Protection System, Ka Yang, Nalin Subramanian, Daji Qiao, and Wensheng Zhang, Iowa State Unviersity (URL: http://www.cs.iastate.edu/~wzhang/papers/eagleVision.pdf) (Jan. 2009).

(56) References Cited

OTHER PUBLICATIONS

"Using context-profiling to aid access control decisions in mobile devices", Gupta et al., Nokia Research Center (URL: http://www.cerias.purdue.edu/assets/symposium/2011-posters/372-C48.pdf) 2011. (Please refer to the 1-page file named 372-C48.pdf).
Smartphone Security Beyond Lock and Wipe (Jun. 10, 2010): http://www.enterprisemobiletoday.com/article.php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
U.S. Appl. No. 10/524,353, office action dated Sep. 21, 2012.
International Application No. PCT/CA 03/01245, PCT Written Opinion, dated Sep. 20, 2004.
International Application No. PCT/CA 03/01245, PCT International Preliminary Examination Report, dated Nov. 29, 2004.
International Application No. PCT/CA 03/01245, International Search Report dated Dec. 23, 2003.
International Application No. PCT/CA 03/01245, PCT Written Opinion, dated Apr. 23, 2004.
EP Patent Application No. 12197474.5, Extended European Search Report dated Mar. 15, 2003.
Canadian Intellectual Property Office, Office Action, App. No. 2804732, Jan. 20, 2015.

* cited by examiner

| Interface List | Available |
|---|---|
| Home WiFi | Yes |
| Cell Interface 1 | Yes |
| Cell Interface 2 | Yes |
| Tethered Interface (Bluetooth™) | Yes |
| Work WiFi | No |
| School WiFi | No |

| Interface List | VPN Profiles |
|---|---|
| 610 Home WiFi | B |
| 612 Cell Interface 1 | A, B, C |
| 614 Cell Interface 2 | A, B |
| 616 Tethered Interface (Bluetooth™) | B |
| 618 Work WiFi | A, C |
| 620 School WiFi | B |

FIG. 6

| Interface List | Available | VPN Profiles |
|---|---|---|
| 710 Home WiFi | Yes | B |
| 712 Cell Interface 1 | Yes | A, B, C |
| 714 Cell Interface 2 | Yes | A, B |
| 716 Tethered Interface (Bluetooth™) | Yes | B |
| 718 Work WiFi | No | A, C |
| 720 School WiFi | No | B |

FIG. 7

METHOD AND APPARATUS FOR AUTOMATIC VPN LOGIN ON INTERFACE SELECTION

CROSS-REFERENCE TO RELATED APPLICATIONS

The present application is a non-provisional of U.S. provisional application No. 61/599,476, filed Feb. 16, 2012, and U.S. provisional application No. 61/599,480, filed Feb. 16, 2012, the entire contents of both of which are incorporated herein by reference.

FIELD OF THE DISCLOSURE

The present disclosure relates to mobile connectivity, and in particular relates to data connection between a device and network.

BACKGROUND

One or more applications on mobile device may occasionally wish make a network/data connection with a network element in some cases. Such a network connection may include a virtual private network (VPN), where a VPN is a private communications network used to communicate confidentially over a publicly accessible network. VPN message traffic can be carried over a public network infrastructure (e.g. the Internet) on top of standard protocols. VPNs are used, for example, to enable employees to connect securely to a corporate network. In other cases the network connection may be a connection to a WiFi network over a WiFi interface.

Standard routing rules for network connectivity may not be suitable for VPN connections since various network interfaces are incompatible with VPN connectivity. For example, certain cellular networks include non-Internet protocol (IP) interfaces. In other situations, a network interface may be virtual and not usable for VPN connections.

Further, interfaces may not be permanent for mobile connectivity. In particular, an interface may be added or become unavailable periodically. VPNs connected to interfaces that go down are affected. Also, a new interface may be better for a VPN than a currently used interface.

BRIEF DESCRIPTION OF THE DRAWINGS

The present disclosure will be better understood with reference to the drawings, in which:

FIG. 6 is a block diagram showing an example of a list associating network connections and VPN connection profiles;

FIG. 7 is a block diagram showing an example of a prioritized interface status list also associating network connections and VPN connection profiles;

DETAILED DESCRIPTION

The present disclosure provides a method at a computing device, the method comprising: maintaining, at the computing device, a prioritized list of connection interfaces available for virtual private network connection; and upon initiation of a virtual private network connection without a specified interface, selecting from the prioritized list of connection interfaces, a highest priority available connection interface.

The present disclosure further provides a computing device comprising: a processor; and a communications subsystem, wherein the processor and communications subsystem are configured to: maintain a prioritized list of connection interfaces available for virtual private network connection; and upon initiation of a virtual private network connection without a specified interface, select from the prioritized list of connection interfaces, a highest priority available connection interface.

The present disclosure provides for a mobile device, but is not meant to be limited to any particular mobile device. Examples of mobile devices can include, for example, smart phones, personal digital assistants, data enabled cellular telephones, tablet computers, among others.

Figure 1:
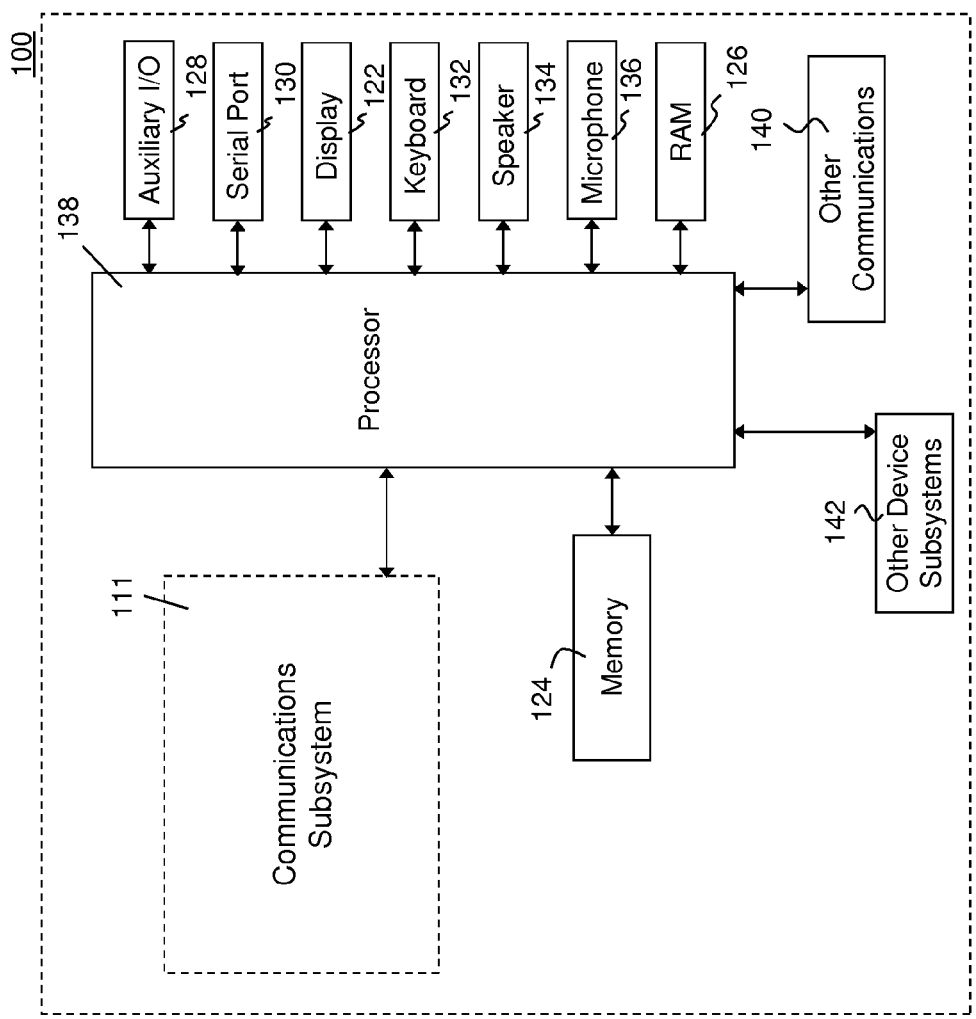
FIG. 1 is an exemplary block diagram showing an example computing device.

Reference is now made to FIG. 1, which shows an exemplary simplified diagram of a computing device 100. Computing device 100 may comprise a tablet, mobile device, personal computer, laptop computer, among others. The embodiment of FIG. 1 is however not meant to be limiting and other devices could be used.

Computing device 100 generally includes a processor 138, which controls the overall operation of the device. Processor 138 interacts with device subsystems such as the display 122, memory 124, auxiliary input/output (I/O) subsystems 128, serial port 130, one or more keyboards or keypads 132, where keyboard or keypad 132 may comprise a physical keyboard or a virtual keyboard or both, one or more speakers 134, microphone 136, other communication subsystem 140 such as a short-range communications subsystem, including Bluetooth and near field communications, and any other device subsystems generally designated as 142. Serial port 130 could include a USB port or other port.

Memory 124 may be segregated into various modes of operation, sometimes referred to as perimeters, as described below. Such segregation may be physical or logical. Operating system software used by the processor 138 may be stored in memory 124. The operating system, specific device applications, or parts thereof, may be temporarily loaded into a volatile memory such as RAM 126.

Applications may be loaded onto the device and associated with a mode of operation (also called a 'perimeter') in some cases. In some embodiments, such applications and data for the application may be stored in memory and associated with the perimeter. For example, separate areas of memory may be used to store the applications or data for each perimeter in some embodiments. In other embodiments, applications or data may be encrypted with a key associated with a perimeter and applications or data for a plurality of perimeters may be stored together. Other options are possible.

In some embodiments, computing device 100 may optionally include a communications subsystem 111 capable of communication with a data access point. Such data access point may include a cellular network or Wi-Fi or WiMAX network, among others. In further embodiments, computing device 100 may be capable of voice communications.

Various embodiments of the present disclosure relate to network connections such as virtual private networks. A network connection, as used herein, is a link between a network element and the mobile device in order to facilitate data exchange between the network element and the mobile device. The link may be over private resources such as within a corporate local area network, or may be over a public network infrastructure. Examples of network connections include VPN connections, WiFi connections over a WiFi interface, among others.

As indicated above, a VPN is a private communications network used to communicate confidentially over a publicly accessible network. VPN message traffic can be carried over a public network infrastructure (e.g. the Internet) on top of standard protocols. VPNs are used, for example, to enable employees to connect securely to a corporate network. Examples of VPN protocols, for example, may include the Internet Protocol Security (IPSec) standard defined by the Internet Engineering Task Force (IETF), Layer 2 Tunneling Protocol (L2TP) or Secure Sockets Layer (SSL) VPN, Point to Point Tunneling Protocol (PPTP), among others.

In accordance with one embodiment of the present disclosure, a method and apparatus are provided for an automatic interface selection for network connections such as VPN connections. While the description below may refer specifically to VPN connections, those of skill in the art will understand that other types of network connections are within the scope of the disclosure. As mentioned above, the standard routing rules for network connectivity may be unsuitable for certain network connections such as VPN connections since various network interfaces are incompatible with VPN connectivity. For example, certain cellular networks include non-Internet protocol (IP) interfaces. In other situations, a network interface may be virtual, and it may be undesirable to establish a VPN connection over a virtual network interface Further, interfaces may not be permanent for mobile connectivity. In particular, an interface may be added or become unavailable periodically.

In accordance with some embodiments of the present disclosure, an interface status list is provided. Statuses provided by a core networking component on a device may be read and the VPN usable interfaces may be distinguished from unusable interfaces by a processor on the device. In particular, reference is made to Table 1 below.

TABLE 1

Example Interface Status List Criteria

| Interface type | Internet Available | Behavior |
|---|---|---|
| Virtual | — | Ignore |
| Physical, not VPN-friendly | — | Ignore |
| Physical, VPN-friendly | No | Monitor |
| | Yes | Monitor, available for VPN Login |

In the example seen in Table 1 above, three types of interfaces are provided. For virtual interfaces, since it may be undesirable to establish a VPN over such an interface, the behaviour for the interface for VPN connectivity in this example is to ignore the interface type.

A second interface type includes a physical, non-VPN friendly interface. As indicated above, this may include a cellular connection with non-IP limitations. This interface type is again ignored in this example.

A third interface type is a physical, VPN friendly interface. For such interfaces, the interface may or may not be available. If the interface is available, as shown in the second column of Table 1, then the device may monitor and may use the interface for VPN log in. Conversely, if the interface is not available, then the mobile device may continue to monitor the interface in case it becomes available for VPN login. An interface is available if a VPN connection can be established over it.

For each interface available to a device, the interface is classified by interface type and put into an interface status list such as Table 1 above. Once the interface status list is built, changes to an interface may be monitored to detect when the interface goes up or down. The interface status list may be used to present the existence or absence of a VPN capable interface. If an interface goes up, it may become a candidate for a VPN connection if the interface type is physical VPN friendly. In this case, automatic selection may occur if a VPN login is requested without an interface being explicitly specified.

Similarly, if an interface goes down while being used for a VPN session, the detection of the interface going down may be used to clean up the VPN processes' internal state.

The interfaces available may be sorted based on a priority order. In particular, reference is now made to Table 2 showing an example of such a priority ordering.

TABLE 2

Example Interface Priority
VPN-Friendly Interfaces, by Priority

Wired
Wi-Fi
Cellular (IP-capable interfaces)
BlueTooth ™ (tethering)

As seen from the exemplary Table 2 above, the VPN friendly interfaces may be sorted based on whether the interface is wired, Wi-Fi, cellular or Bluetooth. The ordering of Table 2 is, however, not meant to be limiting, and is only an example. Further, the connection types are not limiting, and other network connection types, such as WiMAX, IrDA, near field communications, among others, are possible.

From the example of Table 2, a wired interface may be considered by a device to be the highest priority since this interface may be the fastest and most reliable. Similarly, a Wi-Fi interface may be more desirable than a cellular interface because more data throughput is possible over the Wi-Fi connection, in some cases.

Finally a Bluetooth interface may be the lowest priority since the data throughput may be the lowest for such an interface.

In other embodiments, the interface priority may be determined based on other criteria, including the application requiring the interface, security of the interface, among other factors, as described below.

In accordance with the above, when a computing device needs to establish a network connection such as a VPN connection, the device may refer to an internal interface status list, which presents a prioritized list of possible interfaces capable of being used to establish a VPN connection. The interface status list may provide a quick reference to determine which interface is capable of providing the VPN connection. The existence of the interface status list may provide for the abstraction of the interface status information from other sources and filters other unneeded interface status information.

Figures 2, 3:
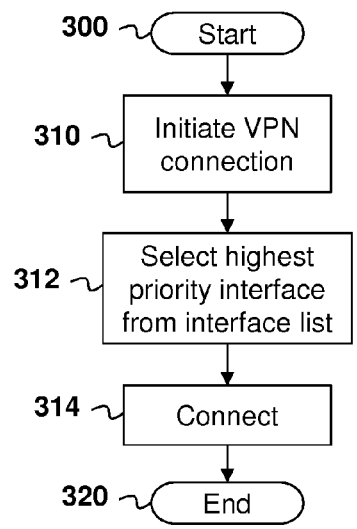
FIG. 2 is a block diagram showing an example prioritized interface status list.
FIG. 3 is a flow diagram showing an example connection of a virtual private network (VPN) over a prioritized connection.

For example, reference is now made to FIG. 2. FIG. 2 shows an example interface status list in accordance with one embodiment of the present disclosure. In particular, in FIG. 2, an ordered list 200 is created based on the principles of Table 1 and Table 2 above, the ordered list showing which interfaces are currently available in a priority order as well as other interfaces which may not be currently available.

In FIG. 2, a first line 210 in the interface list provides a home Wi-Fi interface that is currently available for VPN connection.

Similarly, line 212 showing a first cellular interface and line 214 showing a second cellular interface, indicate both are accessible from a mobile device and can both be used for VPN connections. Also, the mobile device is currently tethered and the VPN could use the tethered interface as well, as shown by line 216.

Based on the above, lines 210, 212, 214 and 216 provide for interfaces that are available to a device for a VPN in the example of FIG. 2, as well as an ordering for the interfaces.

In some embodiments, the first time a connection is established over an interface, the interface may be added to list 200. The interface may then be determined to be available for VPN or not. Thus, for example, a work Wi-Fi line 220 is provided within list 200. However, the work Wi-Fi interface is not currently available to the mobile device (for example, the mobile device may be out of range of the work Wi-Fi interface), and thus the availability is shown as a "No" in list 200.

Similarly, if the user occasionally goes to school and connects to a school Wi-Fi network, the school Wi-Fi network, as shown in line 222 may also be sometimes available for VPN connectivity. Again, this network is not available at the moment in the example of FIG. 2.

In some embodiments, interfaces within list 200 will be maintained for a certain time. For example, if the user does not connect to a certain network interface for one month, then the item may be removed from the list of interfaces.

Thus, in accordance with FIG. 2, a prioritized list may be maintained by a device for VPN connectivity.

Reference is now made to FIG. 3, which shows an exemplary process diagram for a VPN connection. In particular, the process for FIG. 3 starts at block 300 and proceeds to block 310 in which a VPN connection is initiated. The initiation of the VPN connection at block 310 could be done based on a selection of a VPN connection through a user interface or could be automatic, for example when a device boots up, among other initiation times.

In the initiation at block 310, it is assumed that no network interface is specified for the VPN connection. In this case the process then proceeds to block 312 in which the device selects the highest priority interface from the available interfaces in the interface selection list 200.

The process then proceeds to block 314 in which a VPN connection is established over the interface selected at block 312. The process then proceeds to block 320 and ends.

In alternative embodiments, instead of selecting the highest priority interface at block 312, a user interface could be provided which provides an ordered list of interfaces that could be used for the VPN connection. In this case, a prompt could be provided to a user to select the interface to use, with the highest priority interface being the default interface in one example.

The interface list of FIG. 2 may be updated by checking whether each interface is VPN friendly. In particular, reference is now made to FIG. 4.

Figure 4:
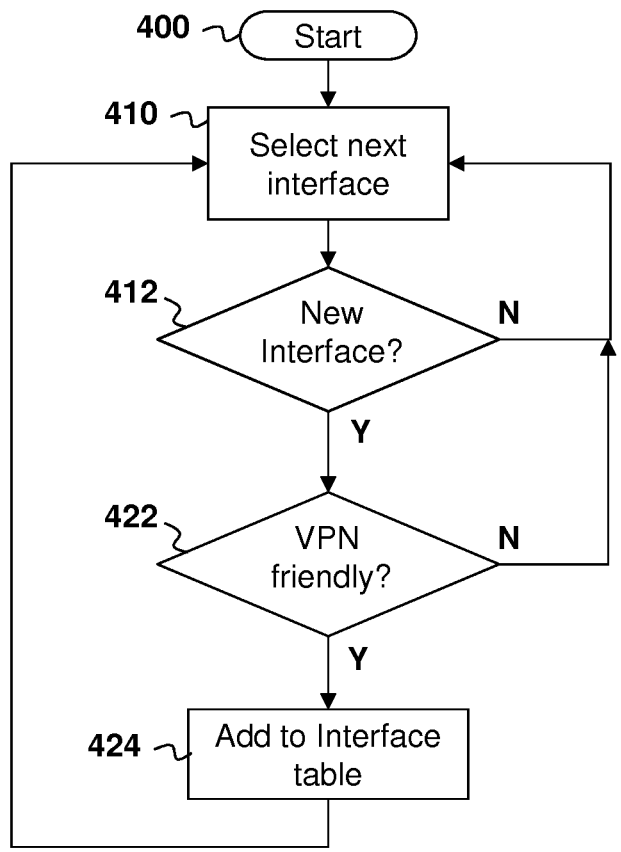
FIG. 4 is a flow diagram showing an example of updating of an interface status list.

The process of FIG. 4 starts at block 400 and proceeds to block 410 in which the next interface is selected. At the first instance of block 410, a first interface may be selected.

Once an interface is selected, the process proceeds to block 412 in which a check is made to determine whether the interface is new or has previously been processed. If the interface is not new, the process proceeds back to block 410 to choose the next interface.

If the interface is new, the process proceeds from block 412 to block 422 in which a check is made to determine whether the interface is VPN friendly. As indicated above, this may involve, for example, ensuring the interface is not virtual and can support IP connectivity.

If the interface is not VPN friendly, the process proceeds from block 422 back to block 410 to choose the next interface.

If the interface is VPN friendly, the process proceeds from block 422 to block 424 in which the interface is added to the interface table. The process then proceeds back to block 410.

Further, the interface list of FIG. 2 may be kept up to date through the checking of the various interfaces to determine whether the interface has gone up or down or has maintained its availability status. In particular, reference is now made to FIG. 5.

Figure 5:
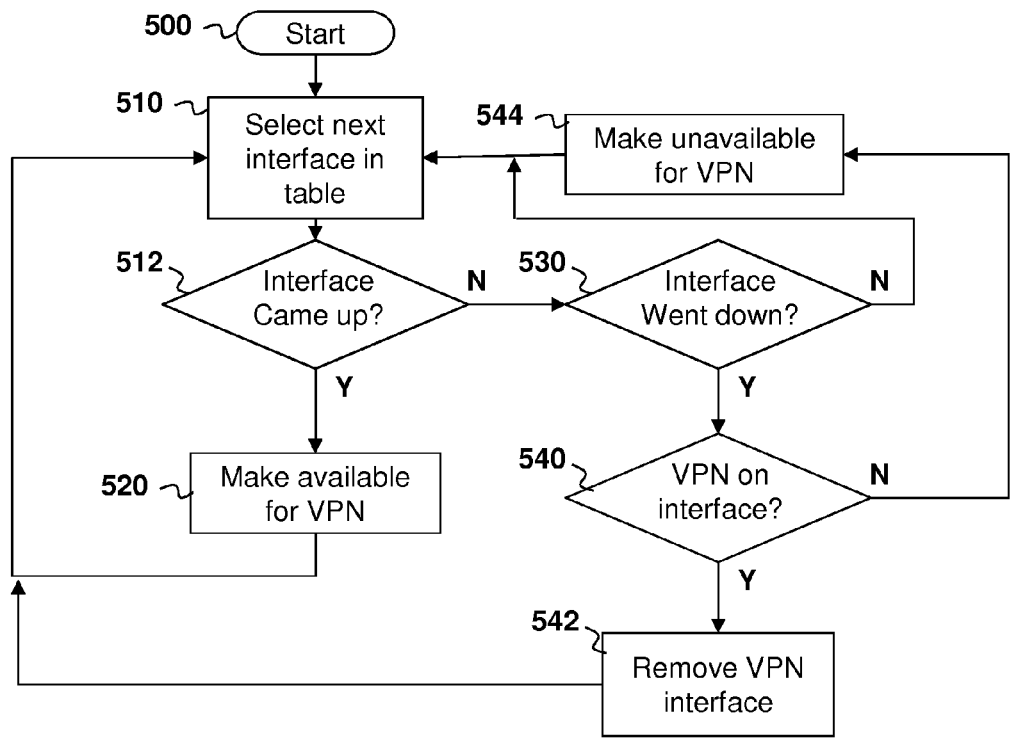
FIG. 5 is a flow diagram showing an example of maintenance of an interface status list.

The process of FIG. 5 starts at block 500 and proceeds to block 510. At block 510, the process selects the next interface on the interface list or table. At the first instance of block 510 a first interface may be selected.

The process then proceeds to block 512 to determine whether the interface that was selected has become available when compared to the previous status of the interface. If yes, the process then proceeds to block 520 in which the interface is made available for VPN connections.

From block 512, if the interface has not recently become available, the process proceeds to block 530 in which a check is made to determine whether or not the interface has gone down. If not, the process proceeds back to block 510 in which the next interface is selected.

If the interface has gone down, the process proceeds to block 540 in which a check is made to determine whether there was an active VPN connection on that interface. If not, the process proceeds from block 540 to block 544, in which the interface is made unavailable for VPN connections, and then to block 510 to select the next available interface.

From block 540, if a VPN connection is active on the interface that is no longer available, the process proceeds to block 542 in which the VPN status is cleaned up. In this case, the VPN connection may be dropped and an internal VPN state may be adjusted accordingly.

From block 542 the process proceeds to block 510 in which the next interface is selected.

At block 510, if there are no more interfaces available in the table, the process may again select the first interface and process repeats itself.

Based on the process diagram of FIGS. 4 and 5, the interface status and availability for VPN connections can be maintained for the interface status list.

In addition to the embodiments of FIGS. 2 to 5 above, in some embodiments, a network connection may be associated with a network connection profile. An interface may be associated with one or more network connection profiles. As used herein, a network connection profile defines various parameters that may be used to connect to a network element, and may include, for example, any combination of a connection method, interface, user credentials, network element server names, and other details that allow a mobile device client or application to connect and authenticate with the network element.

In particular, while the list 200 of FIG. 2 provides for interfaces and whether they are available for VPN connection, a particular network connection profile may limit the type of interface that may be used. For example, a VPN may have a network connection profile which specifies that the connection must be made over a cellular interface. In other examples, the VPN connection may have a network connection profile that indicates that connection can only utilize trusted interfaces and a particular subset of interfaces may be provided that are trusted.

Reference is now made to FIG. 6, which shows an exemplary list 600 having interfaces and an indication of network connection profiles that are associated with that interface.

In particular, in the example of FIG. 6, three exemplary network connection profiles are provided. A first network connection profile "A" may be utilized to establish a network connection for connecting certain enterprise applications to an enterprise VPN server. A second network connection profile "B" may be used to establish a network connection for connecting to a user's home network VPN server. A network connection profile "C" may be used to establish a network connection for connecting one or more applications on the mobile device to a different enterprise network VPN server.

In the example of FIG. 6, the home Wi-Fi network is only available for network connections associated with network connection profile B, as shown by line 610. Cell interface 1 is available for network connections associated with network connection profiles A, B or C, as shown by line 612. Cell interface 2 is available for network connections associated with network connection profiles A or B, as shown by line 614. The limitation on the interface for network connections associated with a particular profile may be dependent on the nature of the network connection associated with the network connection profile. For example, the home WiFi interface may not be considered secure enough by an enterprise, and thus profiles A and C, which are described above to be used for connecting to enterprise VPN servers, may not be allowed to use the home WiFi interface.

Further, a tethered interface is available for VPN profile B, as shown by line 616. A work Wi-Fi interface is available for VPN profiles A and C, as shown by line 618 and a school Wi-Fi network is only available for VPN profile B, as shown by line 620.

Thus, for example, when an application attempts to establish a new VPN network connection, the network connection profile for the VPN connection can be established and an appropriate interface can be selected from the prioritized list of interfaces. For example, in one embodiment, an application on the mobile device may be a VPN client, which, when launched, attempts to connect to a network element to establish a VPN connection. The application will have access to a network connection profile which may provide information such as client credentials, the address of the VPN server, interface, among other information, to populate the connection request. Authentication may then occur at the VPN server before data can be passed between the mobile device and network element. The network connection profile may be used to determine an appropriate interface over which to establish the VPN connection.

The lists of FIG. 2 and FIG. 6 could be used independently to determine an interface to use. In other embodiments, the lists could be combined. Reference is now made to FIG. 7, which shows an exemplary table including the interface, the VPN profile as well as the availability of the interface. In this case, the list 700 can be ranked in accordance with the interface type and the availability.

In particular, the combination of FIGS. 2 and 6 provides for an interface list 700, in which line 710 provides that home Wi-Fi network is available but only for network connections associated with network connection profile B. Similarly, line 712 provides that a first cellular network is available for network connections associated with network connection profiles A, B or C. Further, line 714 provides that a second cellular network is available for network connections associated with network connection profiles A or B.

Line 716 provides that the tethering is available but only for VPN profile B.

Other networks, such as work Wi-Fi network shown at line 718, are unavailable at the moment but if it becomes available then network connections associated with network connection profiles A or C could connect over it. Similarly, a school Wi-Fi network as shown at line 720 and is currently unavailable but if it becomes available could be used for network connections associated with network connection profile B.

Figure 8:
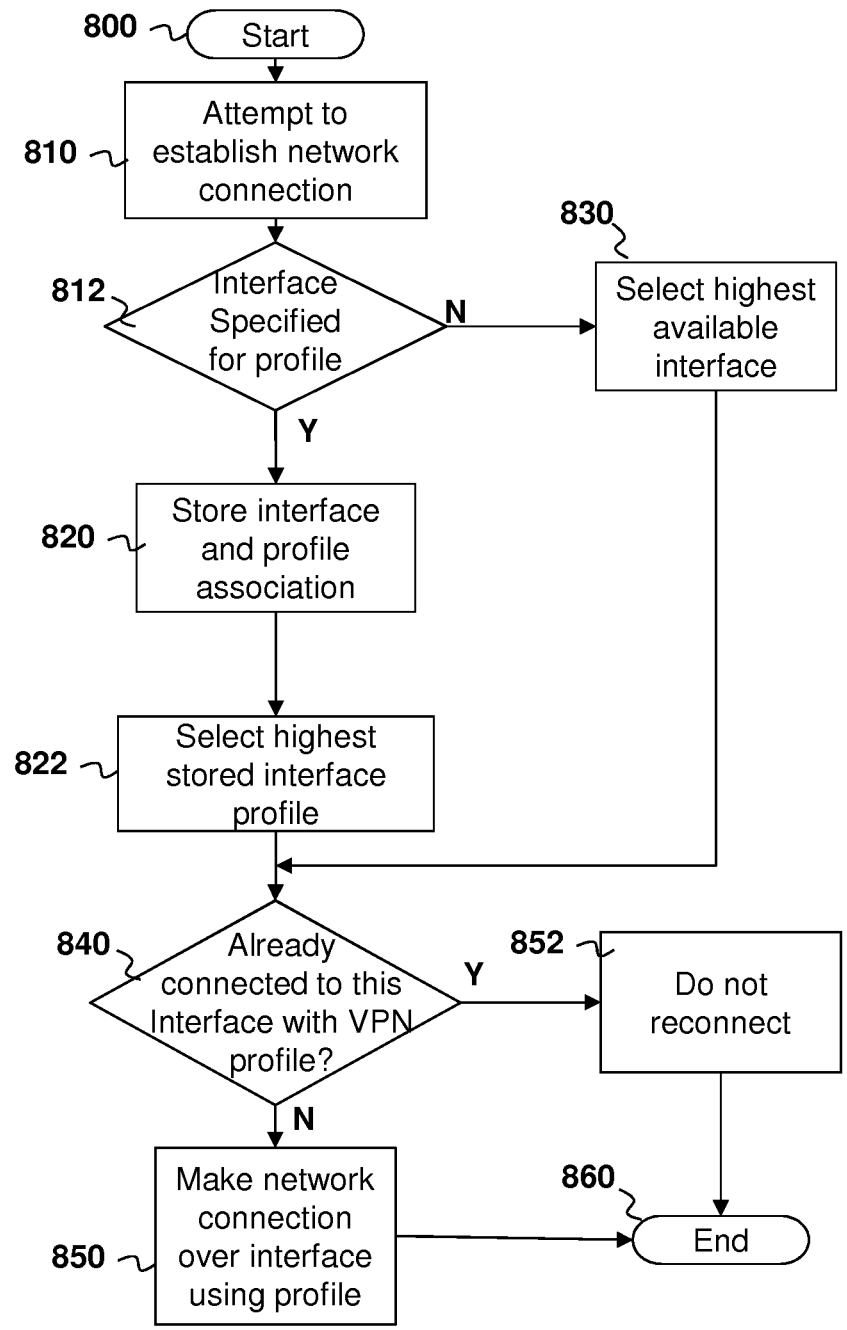
FIG. 8 is a flow diagram showing example maintenance of an interface status list associating VPN profiles.

Reference is now made to FIG. 8, which shows an exemplary process for associating a network connection profile with an interface and further shows an exemplary process for connecting to the highest priority interface available in accordance with some embodiments of the present disclosure. In particular the process starts at block 800 and proceeds to block 810 in which an application on the mobile device attempts to establish a network connection. The connection attempt of block 810 may be based on a VPN login attempt from a user interface, an automatic VPN login, for example when a device powers up, among other login requests. The connection attempt is associated with a network connection profile for the network connection, such as a VPN profile.

From block 810 the process proceeds to block 812 in which a check is made to determine whether the network connection profile associated with the connection attempt specifies an interface. If yes, the process proceeds to block 820 in which the interface and profile association are stored.

The process then proceeds from block 820 to block 822 in which the highest priority interface with a stored association to the profile is selected. For example, in some embodiments a previous connection may have been made to a higher priority interface using the profile, and the association between that interface and the profile may be stored until the interface becomes unavailable. Thus, regardless of the interface specified at the connection attempt of block 810, the highest priority interface with a stored association to a network connection profile is selected.

From block 812, if the interface is not specified in the profile associated with the connection attempt, the process proceeds to block 830 in which the highest priority available interface is selected for the VPN connection.

The process then proceeds from blocks 822 or 830 to block 840 in which a check is made to determine whether a network connection already exists for the profile on the selected interface. If yes, no reconnection is required, as shown by block 852. However, if the connection does not already exist for the profile on the selected interface, the process proceeds to block 850 in which a connection on the interface using the network connection profile is made.

From blocks 850 and 852 the process proceeds to block 860 and ends.

Based on the above, a transition of VPN connections between interfaces may be provided, for example, whenever an interface is added or dropped. In some embodiments, stored interface associations may track previous used VPN profiles and a transition may be triggered on the detection of an interface going up or down. This may provide handoff of VPNs connections to higher priority interfaces and re-establish VPN connections on lower priority interfaces if the higher priority interface drops.

In some embodiments, if an interface is available and it is unknown whether the interface supports the VPN connection or not, a VPN connection may be attempted over the interface if it is a higher priority interface than the interface currently used for VPN connections. In this way, new, higher priority interfaces may be checked to determine whether or not the VPN connection should be established over those higher priority interfaces.

In certain situations, a dual or plural mode of operation may exist for a mobile device, where the mobile device may run certain applications and access certain data in one portion that is not accessible or cannot be run in a second portion. Such modes of operation are described as "perimeters" herein. For example, a work perimeter may be used for enterprise applications and data, and a personal perimeter may be used for personal applications and data. The perimeter of the application that wants a network connection may determine which network connection profile and consequently which interface may be used to establish the VPN connection, as described below.

Figure 9:
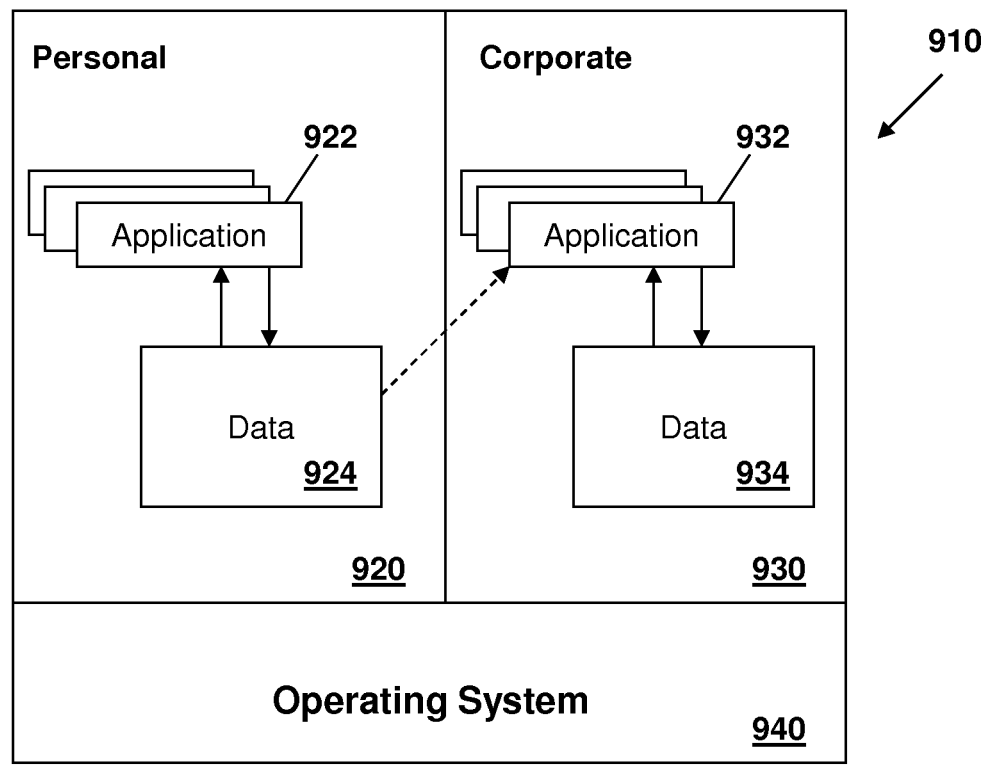
FIG. 9 is a block diagram showing an example application and data memory on a mobile device.

Reference is now made to FIG. 9, which shows an exemplary block diagram of the memory 910 of a mobile device. The memory is configured to store applications and application data, such combination of stored applications and data being referred to herein as an application space. The memory 910 is divided, either physically or logically, into two perimeters, which represent a personal perimeter 920 and a corporate perimeter 930 in the example of FIG. 9.

Corporate perimeter 930 may comprise a portion of memory on the mobile device segregated for data, applications, or both, which may be considered sensitive to a business, corporation, enterprise, government, non-profit organization, a user of the device or any other entity setting an information technology policy for the computing device.

Personal perimeter 920 may comprise a portion of memory segregated for personal applications and data, where personal applications or data may be considered outside of or separate from an information technology policy.

Within personal perimeter 920, a plurality of applications 922 can communicate with data 924 that is considered to be personal data.

Similarly, in corporate perimeter 930, a plurality of corporate applications 932 communicate with corporate data 934.

By segregating corporate applications from personal applications and data associated with each, corporate IT policies can be implemented on the device for the corporate data, thereby protecting the data, while still allowing for personal applications and personal data on the device. This may provide for more flexibility for a user and a better user experience.

Operating system 940 enforces the segregation of the data as described in more detail below.

The designation of each application as either a personal application or a corporate application may be done in several ways. In one embodiment, a corporate IT policy can be set for the loading of applications onto the device, where certain specified applications are designated by the IT policy to be corporate applications. Other applications that are not within the list of corporate applications could be considered, by default, to be personal applications. In other embodiments, a user, administrator, carrier or other entity can use a configuration program or a navigation entity (application launcher) to designate the various applications on the device as personal or corporate applications. Further, signatures applied to applications could also be used for the designation. Other examples of the designation of applications as corporate and personal would be apparent to those skilled in the art having the benefit of the present disclosure.

In further embodiments, hybrid applications that might have both personal and corporate uses could be duplicated between the corporate perimeter 930 and the personal perimeter 920. In this way, if a user wants to use a particular application for personal reasons, the user could open the application 922 in the personal perimeter. Conversely, if the user wants to use the same application for corporate purposes, the user could open the application 932 in corporate perimeter 930.

Thus, for example, a Documents To Go™ document editor could be provided for both the personal space and the corporate space, thereby allowing the editing of both personal documents and corporate documents, while maintaining security for corporate data.

In one embodiment, corporate applications 932 could be provided with additional security over personal applications. For example, before a corporate application 932 could be launched, the user may need to enter a password. Further, inactivity timers could be implemented to lock corporate applications after a period of inactivity while leaving personal applications unlocked. A locked application may require a user to initially enter a password to unlock the application and interact with and access data from the application.

The designation of the application may further limit what data that application has access to. Thus, for example, corporate applications may run in their own mode where any data that they write can never be accessed by the personal application. The limitation would be that personal applications 922 are not able to read corporate data 934, nor is a corporate application capable of writing to personal data 924.

Similarly, a personal application may not be able to write to corporate data 934. In some embodiments, corporate applications 932 may not be able to read personal data 924. In other embodiments, corporate applications 932 may be able to read personal data 924.

Corporate data 934 may be encrypted for security. Such encryption and the storing of encryption keys would be known to those in the art having the benefit of the present disclosure.

Corporate data may also have date of deletion policies in effect on the mobile device. Thus, if corporate data is not accessed within a certain time period, it could be wiped out pursuant to a corporate data reaping timeline. For example, if data is not accessed on the mobile or computing device for seven days, the data may be deleted from the mobile device.

The user would then need to download the data again if it was required for the mobile device. This may be implemented through tags or data tables associated with the data.

The operating system 940 can enforce the above differentiating rules between corporate perimeter 930 and personal perimeter 920. For example, operating system 940 may implement data access for the various applications 922 and 932, where each application is given a group permission, similar to UNIX group permissions. In other embodiments, other user permissions or other permission systems may also be used. Data is further designated in files that allow access by certain groups. Thus, operating system 940 may allow corporate data 934 to be accessed only by applications 932 that have group permissions to access such data. Similarly, personal data 924 may be written to or read only by applications 922 based on the group permissions of application 922 with regard to data 924. Applications 932 however do not have group permissions to write to data 924 in one embodiment, as enforced by operating system 940.

Access to the data may be maintained for other data functionalities to prevent corporate data from being accessed in the personal mode. For example, copy or cut functionality may be managed between the personal mode and corporate mode. Potentially, no cutting or copying would be allowed in the corporate mode of operation by corporate applications 932.

In other embodiments, cutting and copying may be allowed between corporate applications but may be restricted when trying to paste outside corporate mode. As will be appreciated, this could again be managed by UNIX group permission type model using operating system 940. When cutting or copying various text or images, or other data, a new data file is created which could have group permissions that would restrict where the pasting of that file is allowed to occur. Thus, when using a personal application, if trying to paste corporate data, an error might be returned, or the paste operation may simply not function.

In one embodiment, corporate data 934 may be provided to a device based on a secure connection with the corporate network. For example, this may be done through a virtual private network or other secure connection to an enterprise server.

Further, in one embodiment, the memory 910 may be located on a mobile device. In this case, the mobile device may have a pre-established secure connection with an enterprise server.

Figure 10:
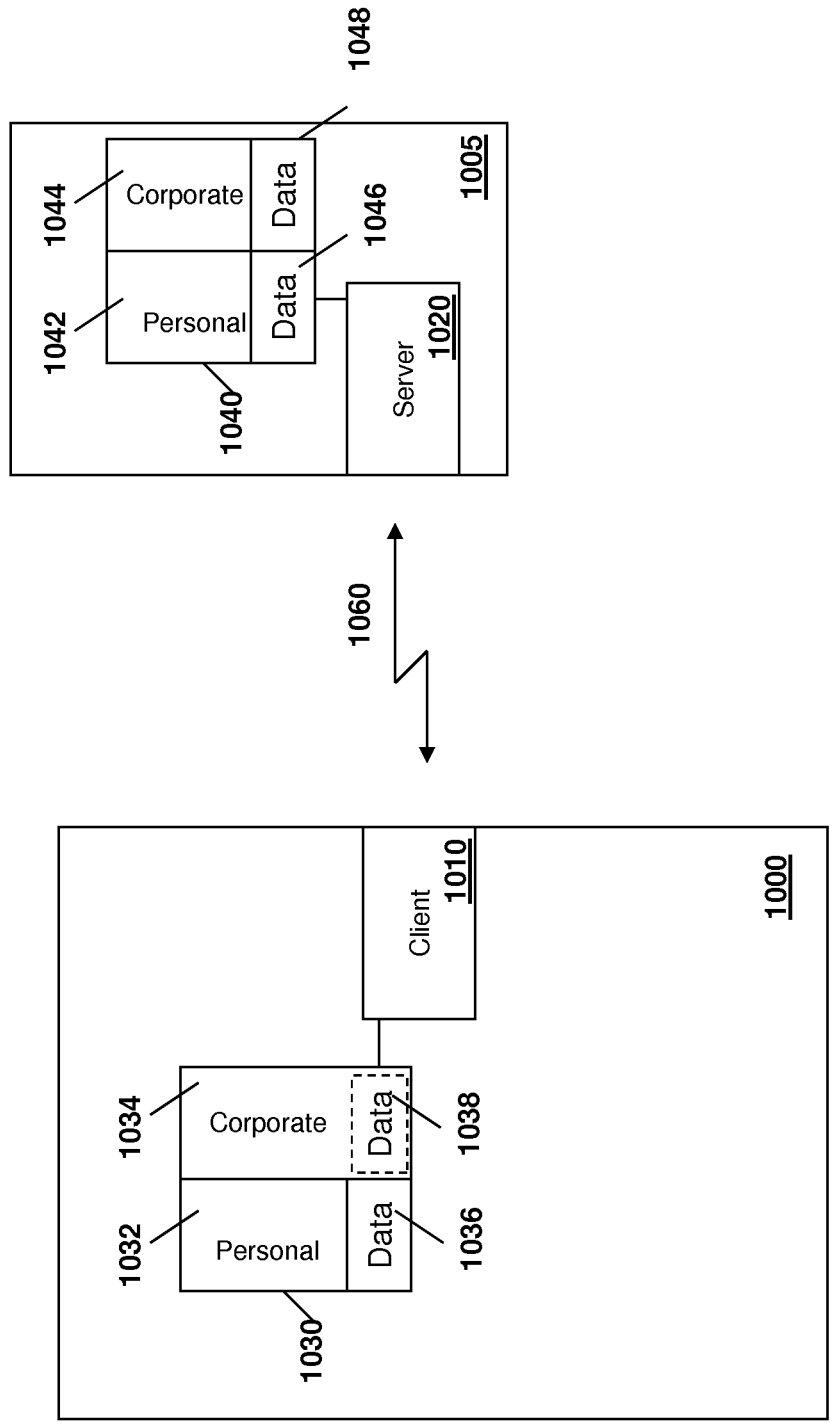
FIG. 10 is a block diagram showing an example of the connection of a corporate device to a personal device.

In some embodiments, a particular device may be considered to not be secure, but may be connected to a secure (IT Trusted) device. Reference is now made to FIG. 10.

In FIG. 10, the secure device is mobile device 1005. However, this is merely an example and other possibilities for secure mobile devices exist.

The unsecured computing device is computing device 1000.

In order to run corporate data on computing device 1000, a client 1010 may be provided on the computing device 1000. Client 1010 communicates with a server 1020 on the secure mobile device 1005 to obtain corporate data.

Further, the computing device 1000 may include memory 1030, which has a corporate space 1034 for storing corporate applications that may be run on computing device 1000. Computing device 1000 may also have a personal perimeter 1032 within memory 1030.

As seen in the example of FIG. 10, the personal perimeter contains applications 1032 which may access data 1036. However, in some embodiments no similar data exists for corporate applications 1034.

In an alternative embodiment, corporate perimeter 1034 could have data 1038 which could be regulated by the same corporate policies as data 1048 on mobile device 1005. Thus, data 1038 would be subject to access restrictions to corporate applications, garbage collection, restrictions on copying or cutting, among the other restrictions provided above. The client 1010 could provide this functionality.

On mobile device 1005 the divided modes are similarly provided. In particular, memory 1040 contains personal applications 1042 and corporate applications 1044. This is similar to the embodiments described above with regard to FIG. 9.

Each of personal application perimeter 1032 and corporate application perimeter 1034 has access to a separate data area, namely data 1046 for personal applications 1042 and data 1048 for corporate applications 1044. In this way, data 1048 cannot be accessed by personal applications 1042.

In an alternative embodiment, mobile device 1005 may be considered to be a corporate device. In this case, application perimeter 1040 would only have corporate applications 1044 and corporate data 1048. Thus, all information stored on mobile device 1005 would be considered to be corporate data, and be accessible only by corporate applications 1034.

In order to provide security, a user of computing device 1005 may start an application as a corporate application 1034. As indicated above, a password may be required to start such applications.

Client 1010 recognizes that a corporate application 1034 is running and can communicate with server 1020 to indicate that corporate data can be provided. In this way server 1020 can access the corporate data that is either in data storage 1048 or the corporate data can be obtained from an enterprise server.

Further, corporate applications 1044 do not necessarily have to be the same as corporate applications 1034. For example, with a larger display, computing device 1054 may be able to run different applications or variations of applications 1044. The corporate data 1048 may be the same between the two sets of applications, but could be displayed to the user or used by corporate applications 1034 differently than the data 1048 would be used on mobile device 1010.

The corporate data may then be provided over a connection 1060 between mobile device 1005 and computing device 1000. Connection 1060 may comprise any short or long range wired or wireless connection, and examples of such connections include Bluetooth™, USB, Infrared Data Assn (IrDA), Wi-Fi, Radio-frequency identification (RFID), Near Field Communication (NFC) connections, among others.

Communication over link 1060 can be secure. That is, corporate data that is passed to computing device 1000 or back to mobile device 1005 may be encrypted using a key known to both computing device 1000 and mobile device 1005.

Further, in one embodiment any data that is stored is encrypted. In this case, the encryption key for the stored data may be stored on mobile device 1005, thus necessitating the connection in order to decrypt the data on the computing device 1000.

Further, it may be a policy that the data is not stored on computing device 1000. Thus, except for some possible caching, corporate data will not be stored on device 1000. Further, client 1010 can ensure that the cache is cleared prior to the corporate application shutting down.

While the above is described with regard to a corporate (enterprise) and a personal perimeters, the number of modes or spaces for applications can be further refined. For example, a corporation may consider sales and other information to be more sensitive than employee information. In this regard, sales and such information may be given a separate category from employee information and may be provided with different data storage and segregation, different passwords for the applications that run and display sales information, among other factors. In this case, three modes would exist—personal, corporate employees, and corporate sales.

Further, the above could be expanded to have a plurality of different modes or application spaces with each one being separated and access to each of the plurality of application spaces and the data associated therewith governed by the operating system. The present disclosure is not meant to be limited to any particular number of modes.

Figure 11:
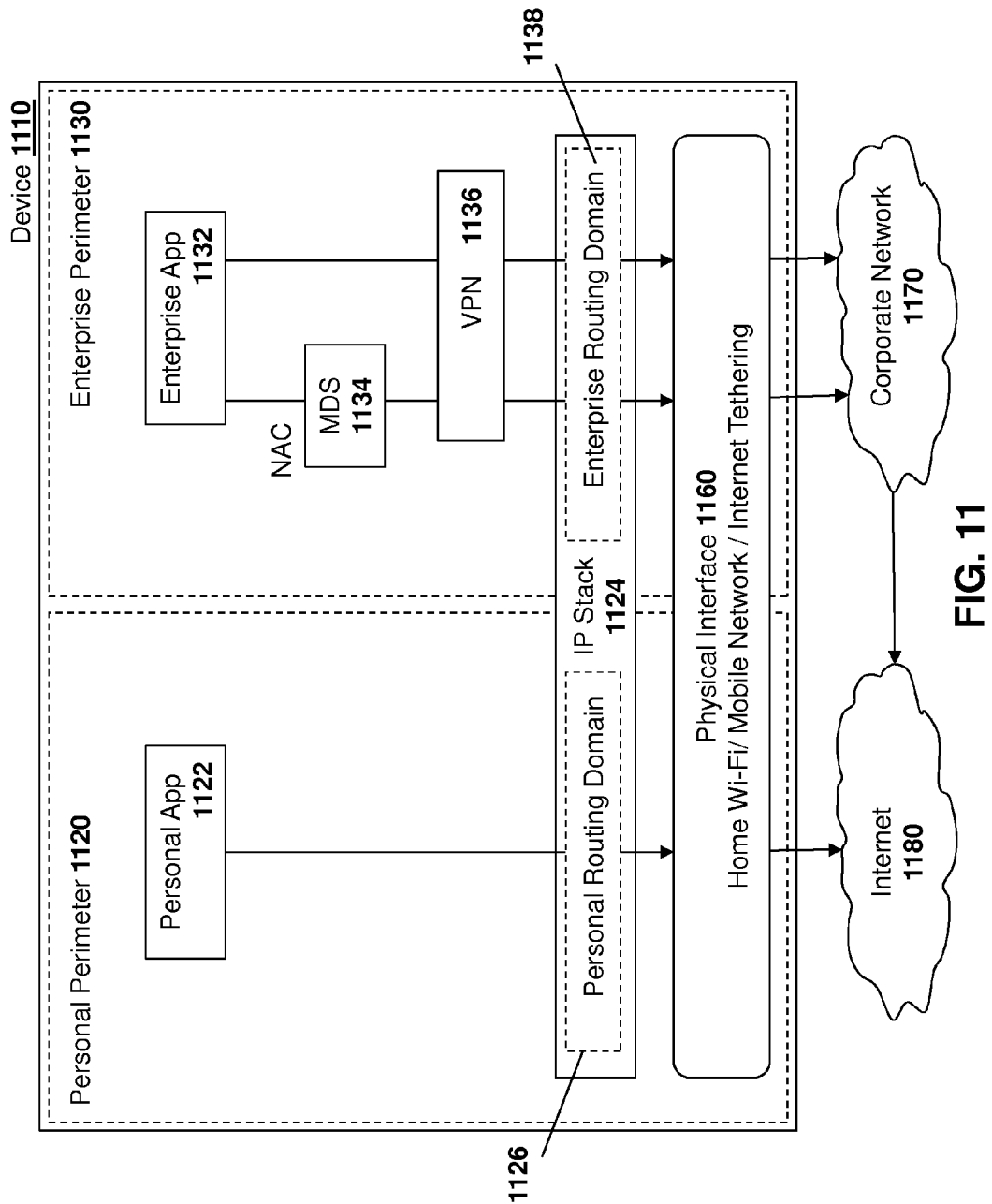
FIG. 11 is a block diagram showing an example of connection of applications on a mobile device through a physical layer to a corporate network or the Internet.

In addition to separating data and applications, in one embodiment of the present disclosure, connection profile data can also be separated. Reference is now made to FIG. 11.

FIG. 11 shows a device 1110 having a personal perimeter space 1120 and a work (enterprise) perimeter space 1130. The example of FIG. 11 is merely meant to be an example and other divisions or different perimeters are possible.

In personal perimeter 1120, a personal application 1122 is running. The personal application 1122 may gain access to the Internet through IP stack 1124 utilizing a personal routing domain 1126.

A physical interface 1160 is then used in order to access internet 1180. Physical interface 1160 may be, in accordance with the above, Wi-Fi, cellular network, tethering, among others.

Similarly, work perimeter 1130 includes the work application 1132 that accesses a corporate network 1170 through one of two routes. In a first route, network access control may be utilized through a mobile data service 1134. Mobile data service (MDS) 1134 provides hypertext transfer protocol or hypertext transfer protocol secure (HTTP/HTTPS) connectivity and also provides an open, extensible and secure interface for extending corporate applications and corporate intranet standards.

MDS 1134, or alternatively work application 1132, may access VPN 1136. VPN uses IP stack 1124, and in particular work routing domain 1138, to access the corporate network 1170 utilizing physical interface 1160.

In an alternative embodiment, instead of accessing the internet or corporate network indirectly through a physical interface, a bridge may be established between a device and a second device where the second device has access to networks, as described with regard to FIG. 10 above.

Figure 12:
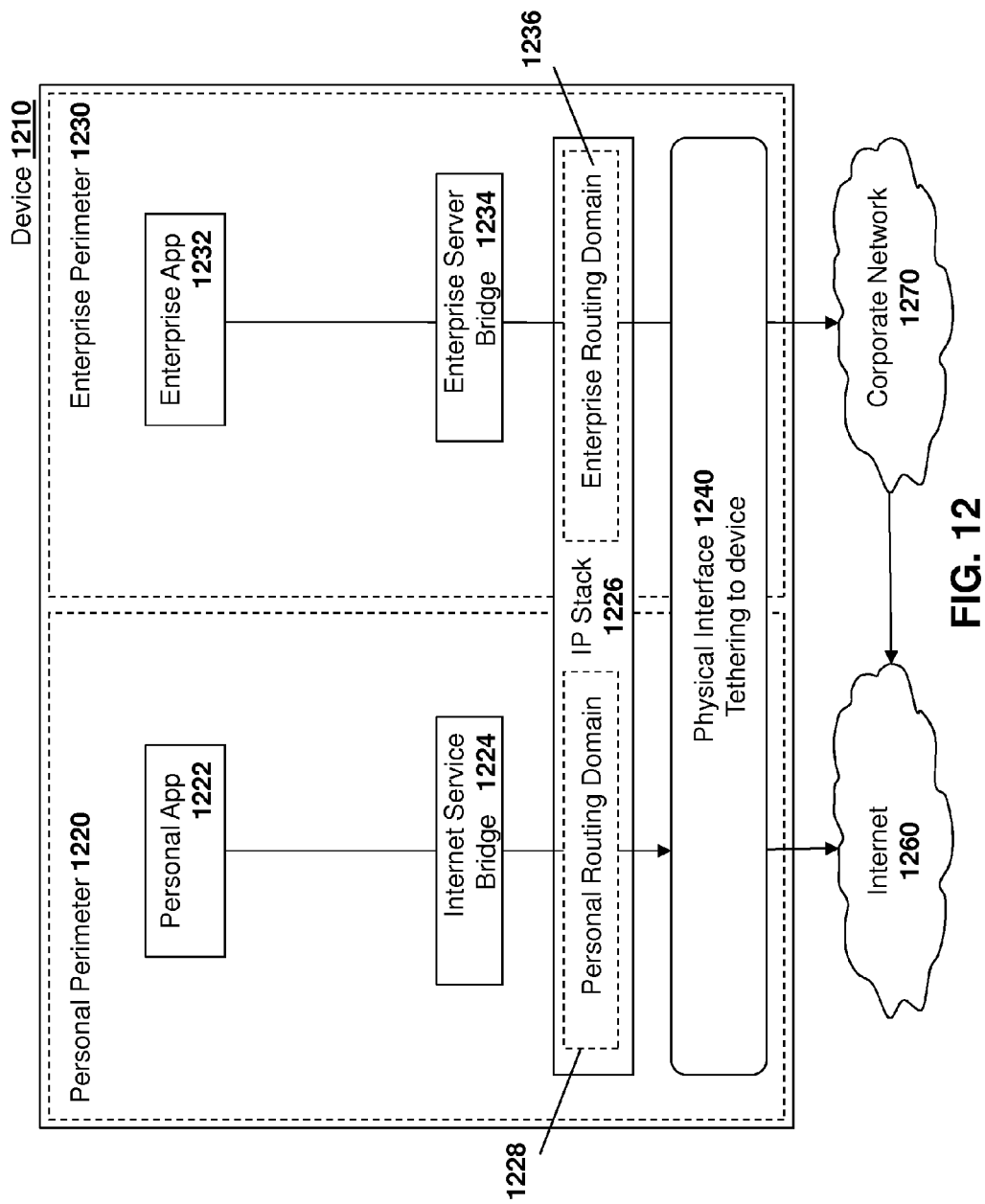
FIG. 12 is a block diagram showing an example connection of applications on a mobile device through a bridge to a corporate network or the Internet.

Reference is now made to FIG. 12 in which a device 1210 includes a personal perimeter 1220 and a work perimeter 1230.

In personal perimeter 1220, personal application 1222 accesses an Internet service bridge 1224 to access the internet. In particular, Internet service bridge 1224 provides connectivity through the tethered device to the internet.

Internet service bridge 1224 communicates through IP stack 1226, which includes a personal routing domain 1228. The IP stack utilizes a physical interface 1240 which includes tethering to the device. Tethering can be, for example, through a wired serial connection such as USB or may be through a wireless short range connection such as Bluetooth, Infrared Data Association (IrDa), Near Field Communications (NFC), among others.

Physical interface 1240 may then be used to access the Internet 1260.

Similarly, in work perimeter 1230, a work application 1232 accesses an enterprise service through a bridge, shown by reference numeral 1234.

The enterprise service bridge 1234 accesses the IP stack and specifically a work routing domain 1236 which may then connect through the physical interface 1240 to a corporate network 1270.

In accordance with the above, applications and data are separated based on mode of operation (perimeter) type. In this case, the profile data for network connectivity, including Wi-Fi or VPN, may also be handled separately based on mode of operation type.

In accordance with one embodiment of the present disclosure, various network connections are specified as belonging to a mode of operation, and thus the corresponding profiles for the network connections are stored and protected within the appropriate mode of operation file system location.

For example, when utilizing the personal versus enterprise mode of operation discussed above with reference to FIGS. 11 and 12, various Wi-Fi or VPN connections may be classified as either personal or corporate Wi-Fi or VPN connections. The designation of the connection may be made at the device. For example, if a user provisions a connection by creating a connection profile, this may be considered to be a personal connection. On the other hand, if a connection is provisioned to the device based on an information technology policy at an enterprise server, for example by providing the device with a connection profile, this may be considered to be an enterprise connection. In some cases, personal connections may be migrated to enterprise connections through communication with the enterprise server. Other ways of designating a connection as personal or enterprise are also possible.

Once a connection is designated personal or enterprise, data for the connection, including the connection profile, and in some cases credentials or certificates, may be stored in the appropriate file system. Thus, referring to FIG. 9 above, the data portions for an enterprise connection will be stored in data storage 934. Similarly, data for personal profiles will be stored in data portions 924.

The separation of the network connection to personal versus enterprise may be then utilized for data and application access based on the type of data or application. Thus, an enterprise application may run and require connectivity over a connection that is designated as an enterprise connection. This forces work traffic to the highest security setting. Conversely, in some instances personal traffic can utilize personal connections. In some cases, personal traffic may also utilize work connections to access the Internet, since the security is simply higher than is required to be. However, the work applications will typically not access the corporate network through a personal connection since the security may not be at a level required by the work application.

In a further embodiment, the wiping of the network profile may also be accomplished based on the designation of the network connection. If, for example, an enterprise server bridge 1234, as seen in FIG. 12, is lost, the enterprise connections may be wiped from the cache. This may be facilitated based on the location of the storage for the connection profile. Thus, the connection profile would only exist if there is a bridge between the second device and the first device.

In some situations, the user interface, and particularly a choice of physical interfaces displayed to a user, may be affected by the profile of the network connection. For example, when a user is attempting to establish a VPN connection within the work or enterprise perimeter, the user may be given a choice of physical interfaces in which only enterprise trusted physical interfaces may be displayed. In other examples, various physical interfaces displayed to the user may be grayed out if they are unavailable to the enterprise server. Other possibilities also exist.

For data associated with a work perimeter, the backup and restore functionality may also be restricted. In particular, the work data may not be backed up or stored in some cases. This may be done for security reasons and thus the classification of a profile as an enterprise connection would prevent the backup or restore from occurring.

Backup and restore or wiping functionality may be accomplished, for example, based on a file system, wherein profiles for enterprise connections are placed into enterprise subdirectories and profiles for non-enterprise connections are placed into personal directories. When a backup/restore functionality occurs, enterprise designated subdirectories may be skipped in one embodiment.

Figure 13:
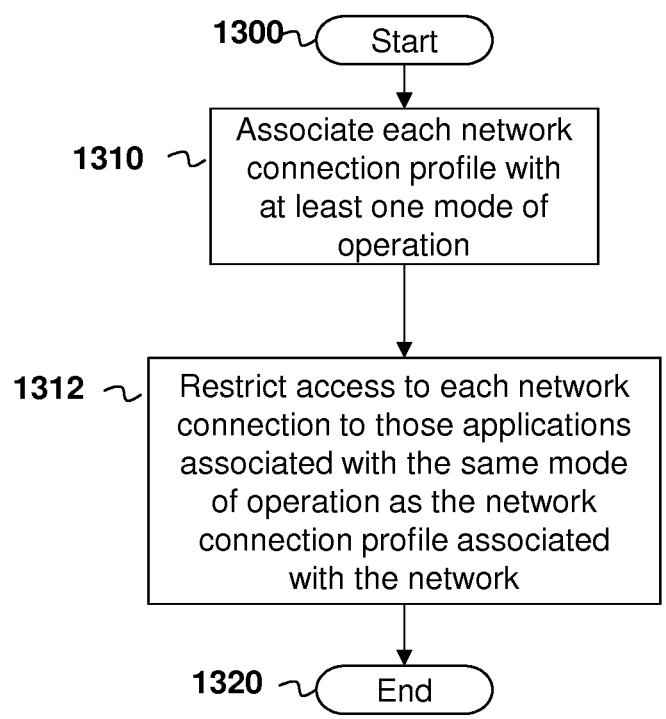
FIG. 13 is a flow diagram showing example designation of profiles to a perimeter.

Reference is now made to FIG. 13. The process of FIG. 13 starts at block 1300 and proceeds to block 1310. At block 1310, a network connection profile is associated with at least one mode of operation. Thus, for example, a specific VPN profile may be considered to be an enterprise VPN profile, such as VPN profiles "A" and "C" from above, and stored within a work perimeter. Similarly, other profiles may be considered to be personal profiles, such as VPN profile "B" from above, stored in the personal perimeter. Other examples are possible.

From block 1310 the process proceeds to block 1312 in which access to each network connection is restricted to those of applications with the same mode of operation as the network connection profile associated with the network connection. Therefore, as described above, a work application may only have access to profiles that are trusted by an enterprise in one embodiment. Other examples are possible.

From block 1312 the process proceeds to block 1320 and ends.

Figure 14:
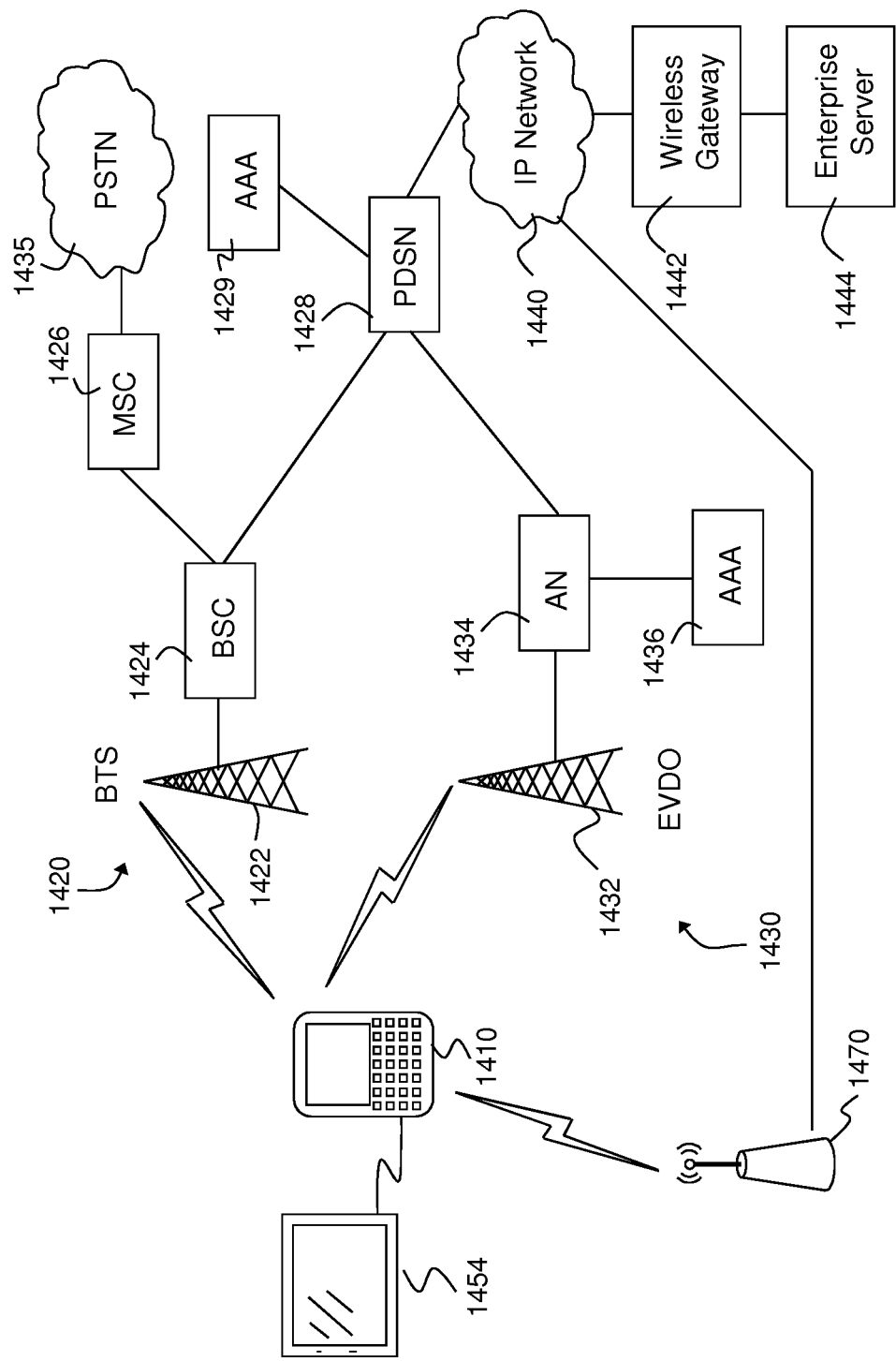
FIG. 14 is an example system architecture diagram for a mobile device.

An example system architecture capable of being used with the above embodiments is shown with regard to FIG. 14. The architecture of FIG. 14 is however not meant to be limiting and other system architectures are possible.

Reference is now made to FIG. 14, which shows a block diagram of an example wireless data network in accordance with the present disclosure and with which the various embodiments of the methods of the instant disclosure may cooperate. FIG. 14 shows a block diagram of a mobile device 1410 and example Code Division Multiple Access (CDMA) 1x network 1420, an example Evolution Data Only (EVDO) network 1430, a public switched telephone network (PSTN) 1435, a data network 1440, wireless gateway 1442 and enterprise server 1444. This is shown merely as an example, and other network architectures, such as Global System for Mobile (GSM), GSM Packet Radio Service (GPRS), Universal Mobile Telecommunications Service (UMTS), Long Term Evolution (LTE), LTE Advanced (LTE-A), High Speed Downlink Packet Access (HSDPA), Wi-Fi, WiMAX, among others, are possible.

The mobile device 1410 may comprise a two-way communication device having data and voice communication capabilities. FIG. 14 further shows an access point 1470 for use with an alternative data connection such as a Wi-Fi or WiMAX connection.

CDMA network 1420 is comprised of a base transceiver station (BTS) 1422 and a base station controller (BSC) 1424. Base station controller 1424 communicates with a mobile switching centre 1426 which, as will be appreciated, is a circuit switched only component communicating with PSTN 1435. Base station controller 1424 further communicates with a packet data serving node (PDSN) 1428 which is a packet switched only component. PDSN 1428 further communicates with IP network 1440.

EVDO network 1430 contains an EVDO sector 1432 which communicates with access node (AN) 1434. Since the EVDO network 1430 is a data only network, access node 1434 communicates only with PDSN 1428 and not with any circuit switch components.

An authentication, authorization and accounting node 1436 is associated with AN 1434, and a similar node 1429 is associated with PDSN 1428.

Operationally, mobile device 1410 communicates wirelessly with CDMA network 1420 using BTS 1422 and BSC 1424 to gain access to the CDMA 1x network.

Mobile device 1410 sends and receives both data and voice services through CDMA network 1420 until an EVDO network connection with established, at which point data can be transmitted over the EVDO network connection.

Further, mobile device 1410 can be connected to a computing device 1454 such as a tablet for a variety of reasons, some of which are provided above. The connection may be through various means such as a Universal Serial Bus (USB) or other serial port, or by short range wireless communications with a computing device 1454. Computing device 1454 can then gain access to data network 1440 and to enterprise server 1444 through EVDO network 1430 or CDMA network 1420 using mobile device 1410. In other embodiments, computing device 1454 may also be capable of accessing networks 1420, 1430 or 1470 directly.

Mobile device 1410 may further have capabilities to communicate through access point 1470 using, for example, Wi-Fi. Access point 1470 connects to a data network 1440 and thus access to wireless gateway 1442 and enterprise server 1444 are possible through access point 1470

In one embodiment, enterprise server 1444 could provide both the IT policies for the mobile device 1410 and also provide access to a permanent store of the corporate data which can be accessed by mobile device 1410.

The embodiment of FIG. 14 is merely an example and other network architectures are possible for mobile device 1410 to connect to enterprise server 1444. The embodiment of FIG. 14 is not meant to be limiting to any particular network architecture.

Further, mobile device 1410 may not be a dual mode or multi-mode device that allows connection to Wi-Fi. In this case, the Wi-Fi connection to access point 1470 would be removed from the embodiment of FIG. 14 and all communication may proceed over the cellular network through the base station 1422 or 1432. In other embodiments, mobile device 1410 may only have access through an access point 1470 and thus the cellular network would be removed from FIG. 14. Other possibilities would be apparent to those skilled in the art having the benefit of the present disclosure.

Computing device 1454, may, in some embodiments, comprise a personal computing device. For example, computing device 1454 may comprise a tablet computer. The user may further wish to use computing device 1454 for corporate functions. However, for security reasons, the corporate IT department may not consider the computing device 1454 to be a secure destination for data, since it is a personal device.

Figure 15:
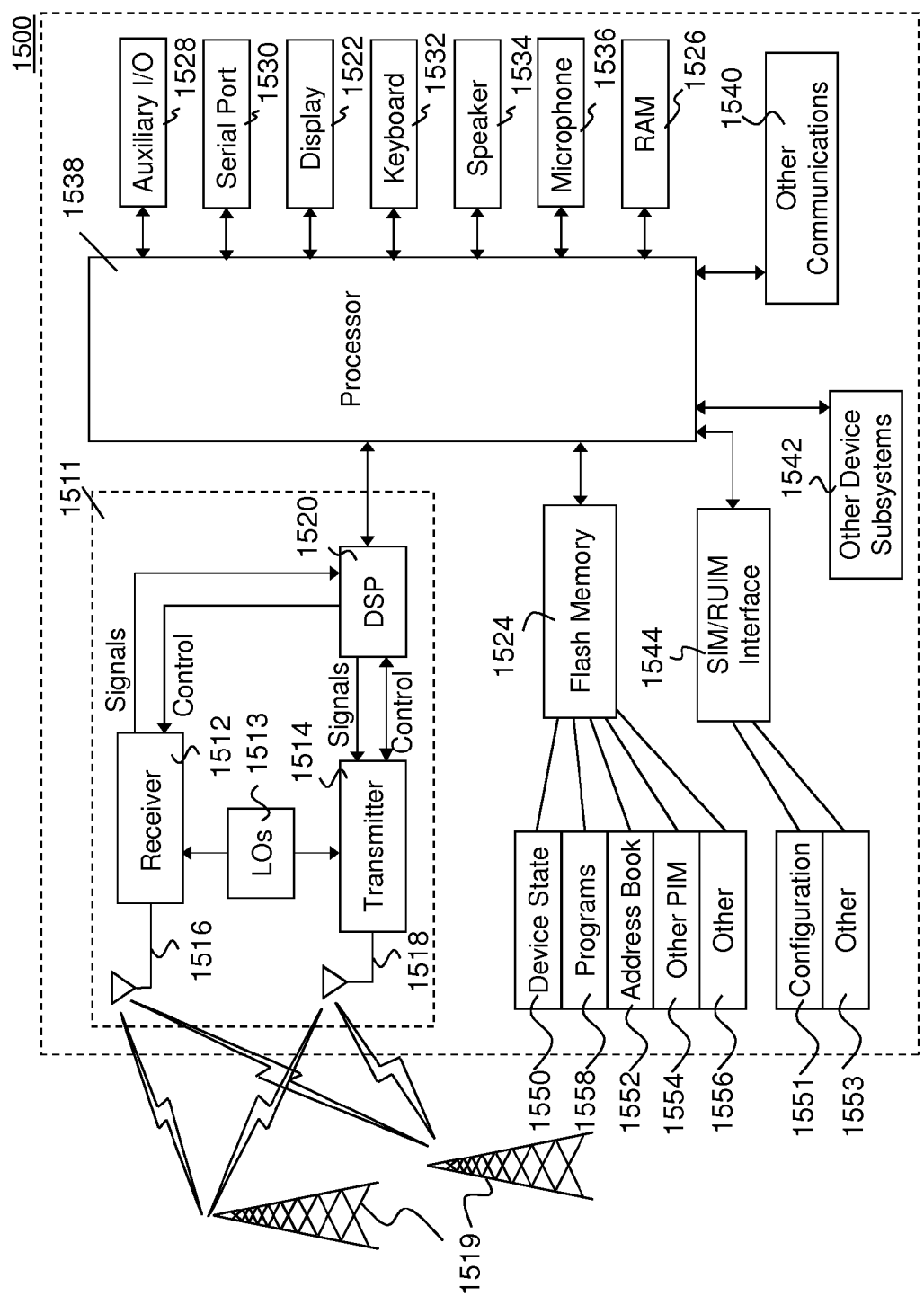
FIG. 15 is a block diagram showing an example mobile device capable of being used with the present disclosure.

The device of FIG. 1 could be a mobile device. One such example mobile device is illustrated below with reference to FIG. 15. The mobile device of FIG. 15 is however not meant to be limiting and other mobile devices could also be used.

Mobile device 1500 may comprise a two-way wireless communication device having any of voice capabilities, data communication capabilities, or both. Mobile device 1500 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a tablet, or a data communication device, as examples.

Where mobile device 1500 is enabled for two-way communication, it may incorporate a communication subsystem 1511, including both a receiver 1512 and a transmitter 1514, as well as associated components such as one or more antenna elements 1516 and 1518, local oscillators (LOs) 1513, and a processing module such as a digital signal processor (DSP) 1520. As will be apparent to those skilled in the field of communications, the particular design of the communication subsystem 1511 will be dependent upon the communication network in which the device is intended to operate.

Network access requirements will also vary depending upon the type of network 1519. In some networks, network access is associated with a subscriber or user of mobile device 1500. A mobile device may require a removable user identity module (RUIM) or a subscriber identity module (SIM) card in order to operate on the network. The SIM/RUIM interface 1544 may be similar to a card-slot into which a SIM/RUIM card can be inserted and ejected like a diskette or PCMCIA card. The SIM/RUIM card can have memory and hold many key configuration 1551, and other information 1553 such as identification, and subscriber related information.

When required network registration or activation procedures have been completed, mobile device 1500 may send and receive communication signals over the network 1519. As illustrated in FIG. 15, network 1519 can consist of multiple base stations communicating with the mobile device. For example, in a hybrid CDMA 1x EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 1516 through communication network 1519 are input to receiver 1512, which may perform such common receiver functions as signal amplification, frequency down conversion, filtering, channel selection and the like, and in the example system shown in FIG. 15, analog to digital (A/D) conversion. A/D conversion of a received signal allows more complex communication functions such as demodulation and decoding to be performed in the DSP 1520. In a similar manner, signals to be transmitted are processed, including modulation and encoding for example, by DSP 1520 and input to transmitter 1514 for digital to analog conversion, frequency up conversion, filtering, amplification and transmission over the communication network 1519 via antenna 1518. DSP 1520 not only processes communication signals, but also provides for receiver and transmitter control. For example, the gains applied to communication signals in receiver 1512 and transmitter 1514 may be adaptively controlled through automatic gain control algorithms implemented in DSP 1520.

Mobile device 1500 generally includes a processor 1538 which controls the overall operation of the device. Communication functions, including data and voice communications, are performed through communication subsystem 1511. Processor 1538 also interacts with further device subsystems such as the display 1522, flash memory 1524, random access memory (RAM) 1526, auxiliary input/output (I/O) subsystems 1528, serial port 1530, one or more keyboards or keypads 1532, speaker 1534, microphone 1456, other communication subsystem 1540 such as a short-range communications subsystem and any other device subsystems generally designated as 1542. Serial port 1530 could include a USB port or other port known to those in the art having the benefit of the present disclosure.

Some of the subsystems shown in FIG. 15 perform communication-related functions, whereas other subsystems may provide "resident" or on-device functions. Notably, some subsystems, such as keyboard 1532 and display 1522, for example, may be used for both communication-related functions, such as entering a text message for transmission over a communication network, and device-resident functions such as a calculator or task list, among other applications.

Operating system software used by the processor 1538 may be stored in a persistent store such as flash memory 1524, which may instead be a read-only memory (ROM) or similar storage element (not shown). Those skilled in the art will appreciate that the operating system, specific device applications, or parts thereof, may be temporarily loaded into a volatile memory such as RAM 1526. Received communication signals may also be stored in RAM 1526.

As shown, flash memory 1524 can be segregated into different areas for both computer programs 1558 and program data storage 1550, 1552, 1554 and 1556. These different storage types indicate that each program can allocate a portion of flash memory 1524 for their own data storage requirements. The applications may be segregated based on the mode or category they fall into. Memory 1524 may further provide security for corporate data and if some applications are locked while others are not.

Processor 1538, in addition to its operating system functions, may enable execution of software applications on the mobile device. A predetermined set of applications that control basic operations, including data or voice communication applications for example, as well as a predetermined set of certificates, will normally be installed on mobile device 1500 during manufacturing. Other applications could be installed subsequently or dynamically.

Applications and software, such as those described above may be stored on any computer readable storage medium. The computer readable storage medium may be a tangible or intransitory/non-transitory medium such as optical (e.g., CD, DVD, etc.), magnetic (e.g., tape) or other memory known in the art.

One example software application may be a personal information manager (PIM) application having the ability to organize and manage data items relating to the user of the mobile device such as, but not limited to, e-mail, calendar events, voice mails, appointments, and task items. Further applications, including, but not limited to, a media player, camera, messenger, mail, calendar, address book, web browser, social networking, game, electronic book reader, map, or other application may also be loaded onto the mobile device 1500 through the network 1519, an auxiliary I/O subsystem 1528, serial port 1530, short-range communications subsystem 1540 or any other suitable subsystem 1542, and installed by a user in the RAM 1526 or a non-volatile store (not shown) for execution by the processor 1538. Such flexibility in application installation increases the functionality of the device and may provide enhanced on-device functions, communication-related functions, or both. For example, secure communication applications may enable electronic commerce functions and other such financial transactions to be performed using the mobile device 1500.

In a data communication mode, a received signal such as a text message or web page download will be processed by the communication subsystem 1511 and input to the processor 1538, which may further process the received signal for output to the display 1522, or alternatively to an auxiliary I/O device 1528.

A user of mobile device 1500 may also compose data items such as email messages for example, using a keyboard 1532, which may comprise a virtual or physical keyboard or both, and may include a complete alphanumeric keyboard or telephone-type keypad, among others, in conjunction with the display 1522 and possibly an auxiliary I/O device 1528. Such composed items may then be transmitted over a communication network through the communication subsystem 1511.

For voice communications, overall operation of mobile device 1500 is similar, except that received signals would typically be output to one or more speakers 1534 and signals for transmission would be generated by a microphone 1536. Alternative voice or audio I/O subsystems, such as a voice message recording subsystem, may also be implemented on mobile device 1500. Although voice or audio signal output may be accomplished primarily through the one or more speakers 1534, display 1522 may also be used to provide an indication of the identity of a calling party, the duration of a voice call, or other voice call related information for example.

Serial port 1530 in FIG. 15 would normally be implemented in a personal digital assistant (PDA)-type mobile device for which synchronization with a user's desktop computer (not shown) may be desirable, but is an optional device component. Such a port 1530 would enable a user to set preferences through an external device or software application and would extend the capabilities of mobile device 1500 by providing for information or software downloads to mobile device 1500 other than through a wireless communication network. The alternate download path may for example be used to load an encryption key onto the device through a direct and thus reliable and trusted connection to thereby enable secure device communication. As will be appreciated by those skilled in the art, serial port 1530 can further be used to connect the mobile device to a computer to act as a modem.

Other communications subsystems 1540, such as a short-range communications subsystem, are further optional components which may provide for communication between mobile device 1500 and different systems or devices, which need not necessarily be similar devices. For example, the subsystem 1540 may include an infrared device and associated circuits and components, near field communications (NFC) or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a computing device, the method comprising:
    accessing, at the computing device, a prioritized list of connection interfaces available for virtual private network connection;
    associating, at the computing device, a virtual private network profile with a plurality of connection interfaces from the prioritized list;
    upon initiation of a virtual private network connection without a specified interface, selecting at the computing device from the prioritized list of connection interfaces, a highest priority available connection interface associated to the virtual private network profile;
    monitoring the plurality of connection interfaces for availability;
    if a connection interface with a higher priority than the connection interface currently used by the virtual private network becomes available, utilizing the higher priority connection interface for the virtual private network; and
    if the connection interface currently used by the virtual private network becomes unavailable, transferring the virtual private network to a highest priority available connection interface within the prioritized list.

2. The method of claim 1, wherein the prioritized list of connection interfaces is sorted based on connection type.

3. The method of claim 2, wherein the sorting comprises ranking connections used for virtual private network interface.

4. The method of claim 1, wherein the prioritized list of connection interfaces is different from a network routing order.

5. The method of claim 1, wherein the associating is performed based on a successful connection by the virtual private network using a connection interface.

6. The method of claim 5, wherein the associating is further performed based on an unsuccessful connection by the virtual private network using a connection interface.

7. The method of claim 1, further comprising:
    checking whether an interface within the prioritized list of connection interfaces becomes available, and if yes, adjusting a priority level for the interface; and
    filtering out connection interfaces unusable for virtual private network connections.

8. A computing device comprising:
    a processor; and
    a communications subsystem,
wherein the processor and communications subsystem are configured to:
    access a prioritized list of connection interfaces available for virtual private network connection;
    associate a virtual private network profile with a plurality of connection interfaces from the prioritized list;
    upon initiation of a virtual private network connection without a specified interface, select from the prioritized list of connection interfaces, a highest priority available connection interface associated to the virtual private network profile;
    monitor the plurality of connection interfaces for availability;
    if a connection interface with a higher priority than the connection interface currently used by the virtual private network becomes available, utilize the higher priority connection interface for the virtual private network; and
    if the connection interface currently used by the virtual private network becomes unavailable, transfer the virtual private network to a highest priority available connection interface within the prioritized list.

9. The computing device of claim 8, wherein the prioritized list of connection interfaces is sorted based on connection type.

10. The computing device of claim 9, wherein the sorting comprises ranking connections used for virtual private network interface.

11. The computing device of claim 8, wherein the prioritized list of connection interfaces is different from a network routing order.

12. The computing device of claim 8, wherein the processor and communications subsystem are configured to associate based on a successful connection by the virtual private network using a connection interface.

13. The computing device of claim 12, wherein said associating is based on an unsuccessful connection by the virtual private network using a connection interface.

14. The computing device of claim 8, wherein the processor and communications subsystem are configured to:
   check whether an interface within the prioritized list of connection interfaces becomes available, and if yes, adjusting a priority level for the interface; and
   filter out connection interfaces unusable for virtual private network connections.

15. A non-transitory computer readable medium having instructions stored thereon for execution by a processor of a computing device, the instructions comprising code for:
   accessing, at the computing device, a prioritized list of connection interfaces available for virtual private network connection;
   associating a virtual private network profile with a plurality of connection interfaces from the prioritized list;
   upon initiation of a virtual private network connection without a specified interface, selecting at the computing device from the prioritized list of connection interfaces, a highest priority available connection interface associated to the virtual private network profile;
   monitoring the plurality of connection interfaces for availability;
   if a connection interface with a higher priority than the connection interface currently used by the virtual private network becomes available, utilizing the higher priority connection interface for the virtual private network; and
   if the connection interface currently used by the virtual private network becomes unavailable, transferring the virtual private network to a highest priority available connection interface within the prioritized list.

16. The non-transitory computer readable medium of claim 15, wherein the prioritized list of connection interfaces is sorted based on connection type.

17. The non-transitory computer readable medium of claim 16, wherein the sorting comprises ranking connections used for virtual private network interface.

18. The non-transitory computer readable medium of claim 15, wherein the prioritized list of connection interfaces is different from a network routing order.

19. The non-transitory computer readable medium of claim 15, wherein the associating is performed based on a successful connection by the virtual private network using a connection interface.

20. The non-transitory computer readable medium of claim 19, wherein the associating is further performed based on an unsuccessful connection by the virtual private network using a connection interface.

21. The non-transitory computer readable medium of claim 15, the instructions further comprising code for:
   checking whether an interface within the prioritized list of connection interfaces becomes available, and if yes, adjusting a priority level for the interface; and
   filtering out connection interfaces unusable for virtual private network connections.

* * * * *